(12) United States Patent
Koumura et al.

(10) Patent No.: US 7,977,847 B2
(45) Date of Patent: Jul. 12, 2011

(54) VEHICLE ALTERNATOR

(75) Inventors: Masatoshi Koumura, Okazaki (JP); Hiroaki Ishikawa, Nagoya (JP)

(73) Assignee: Denso Corporation, Kariya (JP)

( * ) Notice: Subject to any disclaimer, the term of this patent is extended or adjusted under 35 U.S.C. 154(b) by 26 days.

(21) Appl. No.: 12/320,570

(22) Filed: Jan. 29, 2009

(65) Prior Publication Data
US 2009/0189472 A1    Jul. 30, 2009

(30) Foreign Application Priority Data

Jan. 30, 2008   (JP) .................................. 2008-018779

(51) Int. Cl.
H02K 1/22    (2006.01)
(52) U.S. Cl. .................................. 310/263; 310/156.66
(58) Field of Classification Search ....... 310/156.66–69, 310/156.71–77, 263
See application file for complete search history.

(56) References Cited

U.S. PATENT DOCUMENTS

| | | | |
|---|---|---|---|
| 5,306,977 A | 4/1994 | Hayashi | |
| 5,502,424 A | 3/1996 | Kato et al. | |
| 5,973,435 A * | 10/1999 | Irie et al. | 310/263 |
| 6,011,343 A * | 1/2000 | Taniguchi | 310/263 |
| 6,853,112 B2 * | 2/2005 | Nakamura et al. | 310/263 |
| 6,924,580 B2 * | 8/2005 | Tajima et al. | 310/263 |
| 7,569,968 B2 * | 8/2009 | Nakamura | 310/263 |
| 7,605,511 B2 * | 10/2009 | Oowatari et al. | 310/156.72 |
| 7,642,691 B2 * | 1/2010 | Morita et al. | 310/263 |
| 7,755,249 B2 * | 7/2010 | Koumura | 310/263 |

FOREIGN PATENT DOCUMENTS

JP   A-2005-080472   3/2005

OTHER PUBLICATIONS

New U.S. Patent Application filed on Sep. 15, 2008 in the name of Masatoshi Koumora, U.S. Appl. No. 12/232,299.
Chinese Office Action issued Nov. 9, 2010 for Chinese Application No. 200910005826.6 (with translation).

* cited by examiner

Primary Examiner — Thanh Lam
(74) Attorney, Agent, or Firm — Oliff & Berridge PLC

(57) ABSTRACT

The vehicle alternator comprises a rotor. The rotor comprises a first pole core 12, a second pole core 14, a field coil 13, and holders 15 each containing a magnet 16 and disposed between a first claw 123 and a second claw 143. The holder 15 consists of the magnet 16 inserted in a tubular member X having an opening x1/openings x2, and is formed with the tubular member X deformed so as to close the opening x1/openings x2.

15 Claims, 6 Drawing Sheets

INSERTION DIRECTION

INSERTION DIRECTION

INSERTION DIRECTION

AXIAL DIRECTION

INSERTION DIRECTION

VEHICLE ALTERNATOR

CROSS REFERENCES TO RELATED APPLICATION

The present application relates to and incorporates by reference Japanese Patent application No. 2008-018779 filed on Jan. 30, 2008.

BACKGROUND OF THE INVENTION

1. Field of the Invention

The present invention relates to a vehicle alternator.

2. Description of the Related Art

A vehicle alternator comprises a rotor having a pair of pole cores (Lundell-type pole cores), each comprising a plurality of claws. The rotor provided with high-speed rotation generates electricity. A magnet, which is magnetized in a direction to reduce a leakage of magnetic flux, is inserted between two neighboring claws of the pole cores.

In many cases, the magnet is contained in a holder (a case) and is inserted between two neighboring claws like a vehicle alternator disclosed, for example, in Japanese unexamined patent publication No. 2005-80472, in order to protect the magnet and to simplify assembly.

However, the holder disclosed in the above-mentioned Japanese unexamined patent publication allows a part of the magnet to be exposed, which can cause the magnet to get wet when the rotor gets wet The wet magnet accelerates corrosion of the magnet and can deteriorate the generation of electricity caused by decreased magnet flux. Further, if the magnet becomes cracked, the cracked pieces could fly out and can be trapped between the rotor and a stator, thereby locking the rotational movement of the rotor. Resolving these problems is beyond the capability of the conventional vehicle alternators.

On the other hand, the magnet included in the holder can rattle because of production tolerance variations. The rattling of the magnet can lead to breakage of the magnet and can generate noise.

SUMMARY OF THE INVENTION

The present invention has been invented in such view, and it is therefore an object of the present invention to provide a vehicle alternator that can sufficiently protect the magnet and prevent any trouble caused by a corroded and broken magnet. Another object of the present invention is to provide a vehicle alternator that can prevent the magnet from rattling.

A vehicle alternator of the present invention comprises a rotor. The rotor comprises a first pole core having a plurality of circumferentially disposed first claws, and a second pole core having a plurality of circumferentially disposed second claws. Each of the second claws and each of the first claws of the first pole core are disposed alternately facing each other. The vehicle alternator further comprises a field coil disposed at the inner diameter side of the circumferentially disposed claws, and a plurality of holders each containing a magnet and disposed between each first claw and each second claw. The magnet is inserted in a tubular member. The tubular member is open at either one end or both ends. The holder is formed in such a manner that the tubular member is deformed so as to close the opening/openings.

Deforming the tubular member so as to close the opening (s) allows the holder to fully cover the magnet; that is, the holder is made of the tubular member that contains the magnet in its shielded inner space. Accordingly, the magnet is prevented from getting wet, which can prevent the deterioration of output power caused by corrosion of the magnet. Further, such a construction can prevent any broken pieces of the magnet from flying out, resulting in the prevention of any troubles such as the rotational mechanism being locked. This construction can also reduce a number of components used.

In this present invention, the plurality of holders should be produced efficiently. Therefore, the plurality of holders can be made of a single piece of tubular member in which a plurality of magnets are inserted and disposed at regular intervals. The tubular member is then deformed so that its opening/openings are closed. Further, portions of the tubular member locating between two neighboring magnets are deformed so as to allow the magnets to engage with the tubular member in such a manner that the magnets do not move in the direction the magnets are inserted. (The direction the magnets are inserted is referred to as an "insertion direction" hereinafter.) Each holder made of a corresponding portion of the tubular member is disposed between the corresponding first claw and the second claw.

Each of the holders made of the tubular member with its opening(s) being closed provides the same advantages as that described above. Further, such a construction with the tubular member having the deformed portions between the neighboring magnets can securely position each magnet inside the holder. Accordingly, the present invention can sufficiently reduce the number of components used, as well as the production cost. Further, the present invention can produce a plurality of holders at a time.

The portions of the tubular member between the neighboring magnets can be designated as connection portions for connecting the holders. Each connection portion can be bent in a convex shape so that an inner bent face of the convex shape abuts on the apical end of the claw. The convex shape includes a circularly-curved convex arc. The inner bent face designates a face located at the valley side of the curved face. Accordingly, the connection portions and the holders can be disposed along the same circumference, which allows space originally provided near the apical end of the claw to be utilized, thereby not requiring undemanding any particular space for the connection portions at the radial inner side of the claw. This construction can also make the vehicle alternator compact in size and reduce the production cost. Further, this construction with the single piece of tubular member makes an installation operation to the pole core easy.

When a single piece of tubular member forms three or more holders, the neighboring connection portions facing to each other over a corresponding holder can be bent so that the formed convex shapes are directed in opposite directions. In other words, neighboring inner curved faces of the connection portions are directed in opposite directions. As a whole, the deformed tubular member (the holders and the connection portions) is disposed in a bellows manner. Accordingly, the disposed holders are engaged in such a manner that they do not move in the axial direction of the rotor, and are prevented from sliding (move) to the axial direction of the holder.

The neighboring connection portions facing to each other over the holder can be press formed in the opposite directions along the direction perpendicular to the insertion direction (the direction the magnets are inserted). Such a construction allows each connection portion to be disposed nearby the corresponding claws, leading to the more stable positioning of the holders.

The holder can comprise such a first convex portion at its inner face that abuts on the magnet, providing the elastic force to the magnet. Accordingly, the first convex portion closes the gap between the magnet and the holder, thereby preventing the magnet from rattling.

The first convex portion should abut on a flat portion of the magnet. For example, when the magnet has angular corners, the first convex portion should abut on portions excluding the angular corners. The magnet having a rectangular solid shape has flat portions at its faces such as the side and bottom portions, and has angular corner portions (including chamfered portions) at its top end and other edges. The angular corners of the magnet tend to break (chip). Abutting the first convex portion on the flat portion (other than the angular corners) of the magnet can absorb the gap and rattling, not allowing any force (elastic force) to act on the angular portions of the magnet that tend to break. Accordingly, the construction capable of absorbing the rattling can prevent the breakage of the magnet.

The holder can comprise such a second convex portions at its outer faces opposing to the claws that abut on the claws and provide the claws with the elastic force. This construction can prevent the rattling between the holder and the claws.

In this vehicle alternator of the present invention, the claw can comprise outer circumference flanges extending in the circumference direction from the outer circumference portion of the claw. Further, the holder can be engaged with the outer circumference flanges so as not to move in the radial direction. Such a construction sufficiently prevents the holder from flying out in the radial direction of the rotor caused by the rotational movement of the rotor. The magnet covered by the holder, being prevented from flying out, is positioned between the claws in a stable manner.

Further, the claw can comprise inner circumference flanges extending in the circumference direction from the inner circumference portion of the claw. The holder can be engaged with the outer circumference flanges and the inner circumference flanges so that it does not to move in the radial direction. Such a construction further prevents the magnet from flying out in the radial direction, sufficiently locating the magnet between the claws in a more stable manner.

The distance between the outer circumference flange and the inner circumference flange should be arranged shorter than the width of the holder in the radial direction. Accordingly, the holder (the both circumferential ends of the holder) disposed between the claws is press fitted between the inner and outer circumference flanges. This allows the holder to be sufficiently held between the claws, preventing the rattling generated between the holder and the claws. Further, the first convex portion generating the elastic force in the radial direction deforms elastically as it is pressed, which allows the elastic force to act against the magnet all the time. This prevents the magnet from rattling.

The curvature R2 of the R-chamfered portion should be smaller than the curvature R1 of the curved corner. The R-chamfered portion is formed between the radial outside face and the circumference side face of the holder. The curved corner is formed between the circumference side face and the outer circumference flange of the claw. Such a construction allows the holder and the outer circumference flanges to form a sufficient face-to-face contact, reducing the face pressure the holder receives from the outer circumference flanges during the rotation of the rotor. Accordingly, the stress per unit area the magnet receives is reduced, which prevents the breakage of the magnet.

In the same manner, the curvature R4 of the R-chamfered portion should be smaller than the curvature F3 of the curved corner. The R-chamfered portion is formed between the radial inside face and the circumference side face of the holder. The curved corner is formed between the circumference side face and the inner circumference flange of the claw. Such a construction provides the same advantages as described above.

The magnet can be provided with an elastic member at its both side faces parallel to the insertion direction (the direction the magnet is inserted). Such a construction can sufficiently prevent the breakage of the magnet caused by the force (the force provided in the process of press forming) used in deforming the tubular member.

Accordingly, the vehicle alternator of the present invention can protect the magnets from damage, prevent any problems caused by the erosion or breakage of the magnets, and prevent the rattling of the magnets.

DETAILED DESCRIPTION OF PREFERRED EMBODIMENTS

A preferred embodiment of the present invention will be described in detail.

Figure 1:
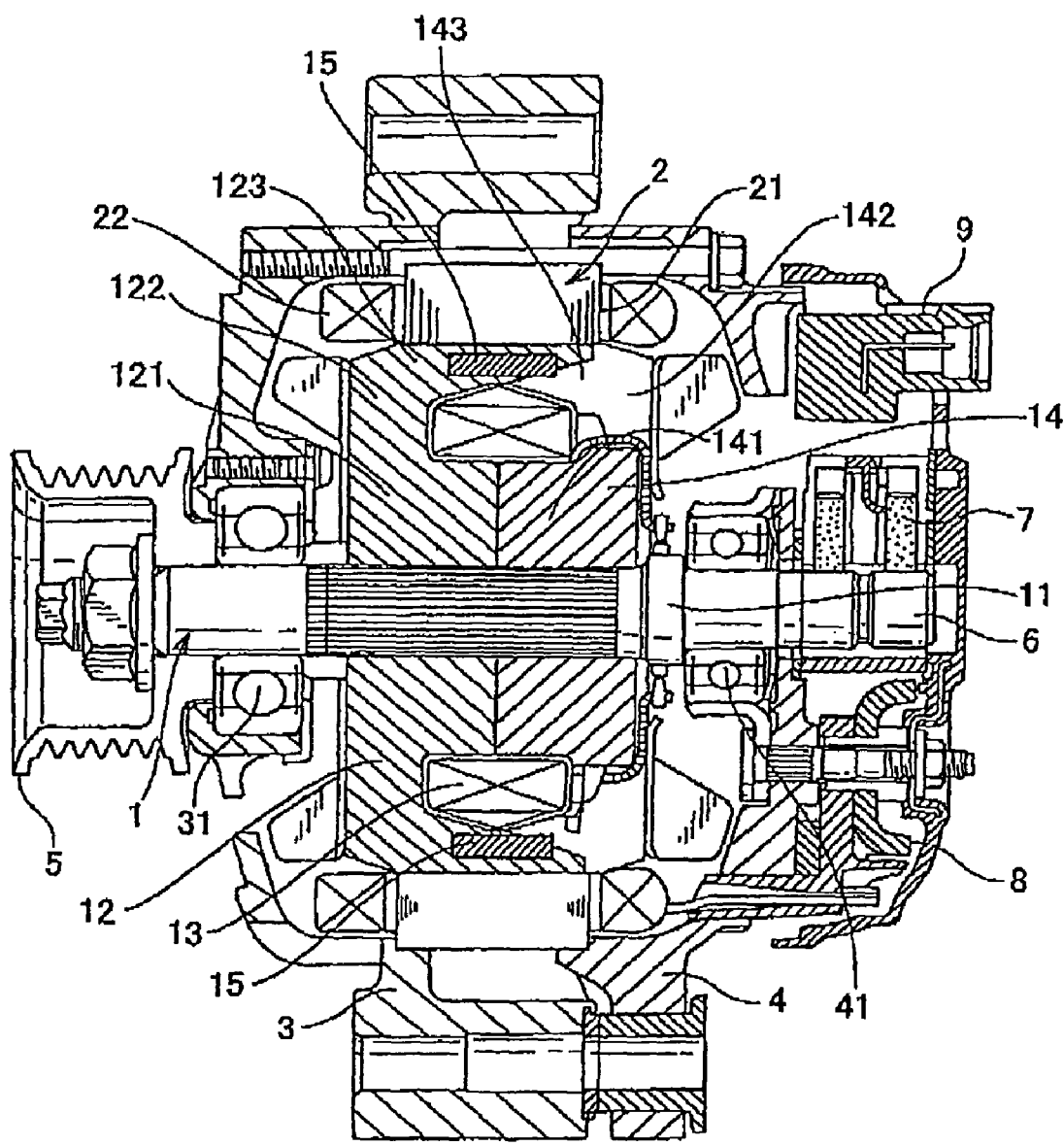
FIG. 1 is a sectional view showing a vehicle alternator that is sectioned in an axial direction.
Figure 2:
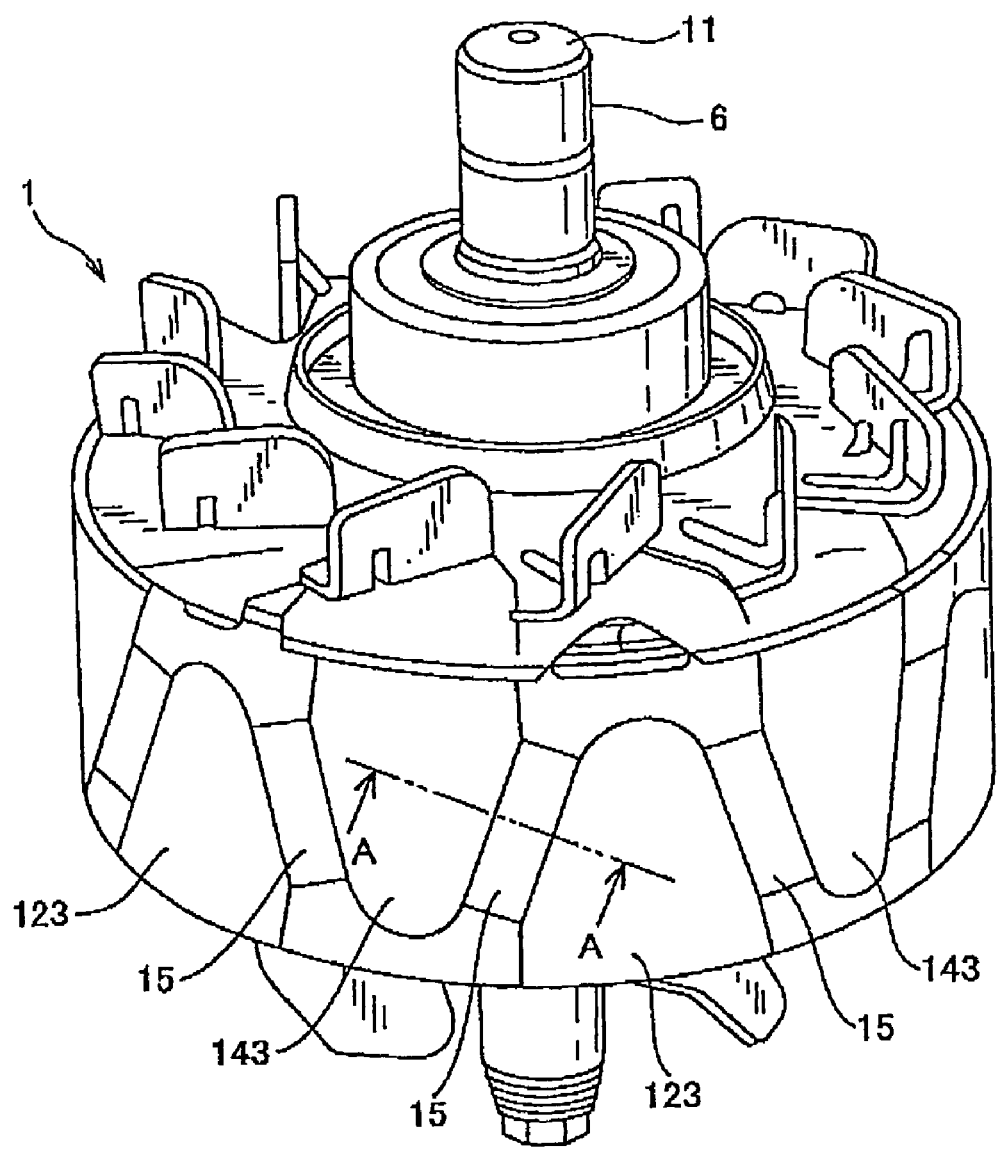
FIG. 2 is a perspective view showing a rotor 1.

First, a primary structure of the vehicle alternator will be described referring to FIGS. 1 and 2. FIG. 1 is a sectional view showing the vehicle alternator sectioned in an axial direction. FIG. 2 is a perspective view showing a rotor 1. FIG. 1 illustrates the rotor 1, a stator 2, a front frame 3, a rear frame 4, a pulley 5, slip rings 6, brushes 7, a rectifier 8, and a regulator 9.

The stator 2 consists of a stator core 21 wound with a stator coil 22, and is fixedly held between the front frame 3 and the rear frame 4. The front frame 3 and the rear frame 4 are adapted to surround the stator 2, and are connected together by bolts, rotatably supporting a rotary shaft 11 of the rotor 11 through the intermediary of bearings 31, 41.

The rotor 1 consists of a front-side pole core 12 fixed to the rotary shaft 11, a field coil 13, a rear-side pole core 14, and holders 15 each of which enclose a magnet 15. The pole cores 12, 14 are so called a Lundell-type pole core. Further, the pole core 12 consists of a boss member 121, a disk member 122 extending from the front end of the boss member 121 in the outer radial direction, and a plurality of claws 123 extending from the disk member 122 in the axially backward direction. The plurality of claws 123 is disposed circumferentially.

The pole core 14 has the same configuration as the pole core 12, and comprises a boss member 141, a disk member 142, and a plurality of claws 143, each of which is provided with its own numeral in this specification. Each of the disk members 122, 142 is integrally formed with the corresponding boss member 121, 141, respectively. The pole cores 12, 14 are made of soft magnetic material.

The rear-end face of the pole core 12 and the front-end face of the pole core 14 are in contact with each other, and the field coil 13 is enclosed between the pole cores 12, 14. The field coil 13 is disposed at the inner radial side of the claws 123, 143. As shown in FIG. 2, the claws 123 of the pole core 12 and the claws 143 of the pole core 14 are alternately disposed in the circumferential direction, in a face-to-face manner.

The magnets (permanent magnets) 16 are magnetized in the direction to reduce a leakage of magnetic flux, as is well known, and each magnet 16 is enclosed in the corresponding holder 15. The holders 15 are made of non-magnetic material, for example, and each holder 15 is disposed between a pair of claws 123, 143. The vehicle alternator having such a construction is well known, so that no more detailed description will be needed. The detailed description of the holders 15 and the claws 123, 143 representing the features of the present invention will be described hereinafter with exemplified preferred embodiments.

First Preferred Embodiment of the Present Invention

Figure 3:
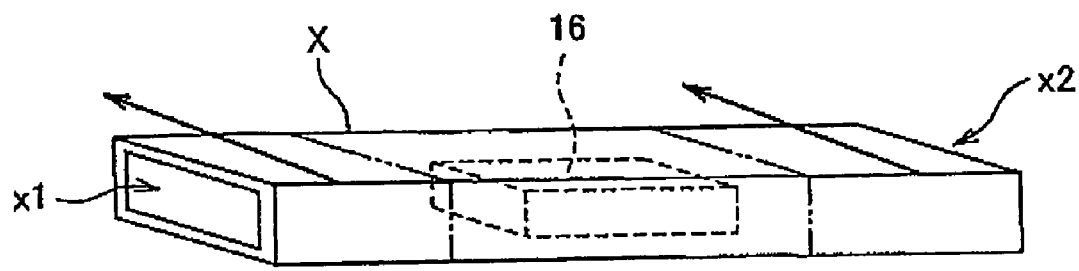
FIG. 3 is a perspective view showing a tubular member X from which a holder 15 is formed.
Figure 4:
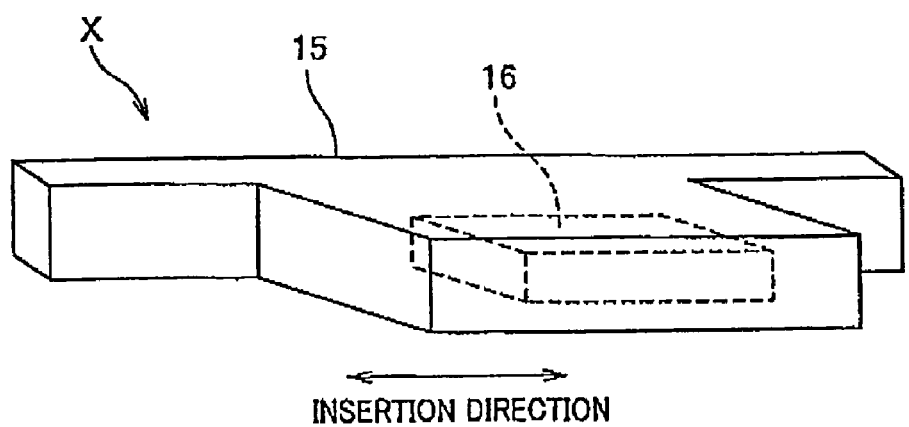
FIG. 4 is a perspective view showing the holder 15.
Figure 5:
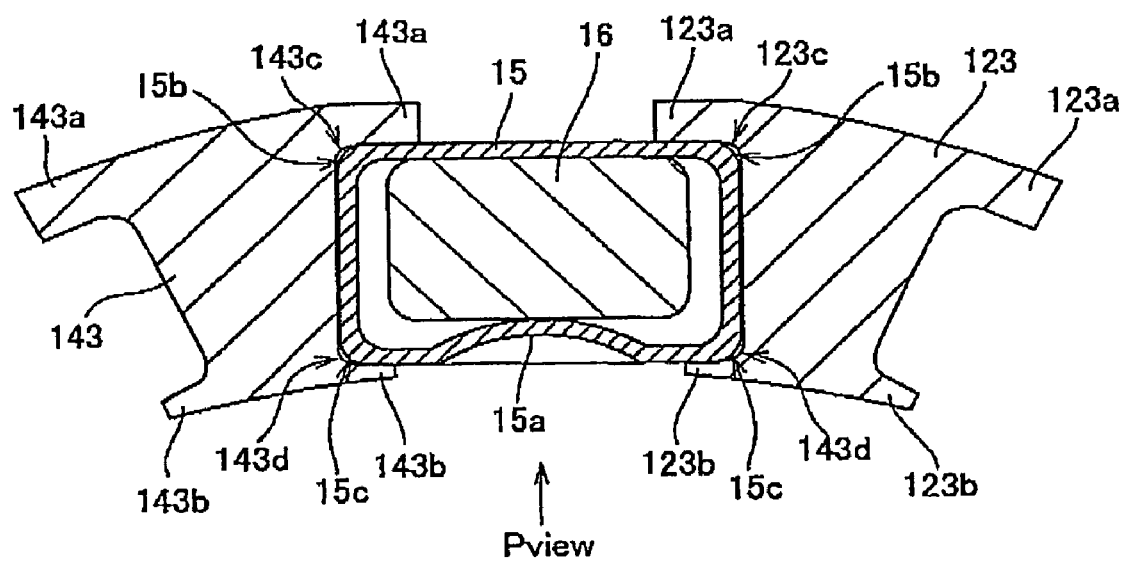
FIG. 5 is a sectional view along the line A-A in FIG. 2.
Figure 6:
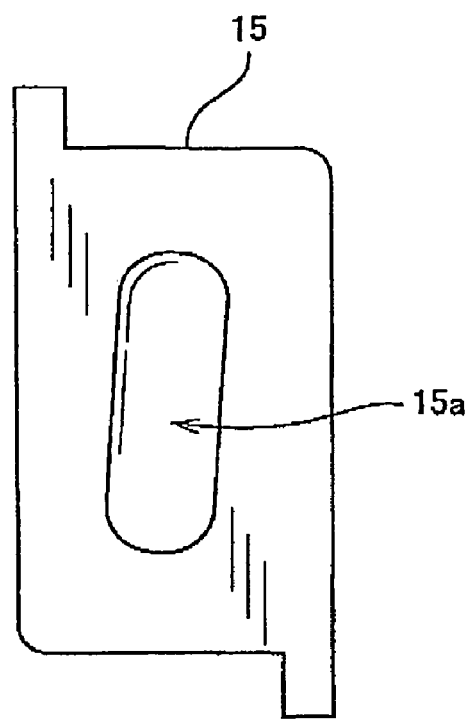
FIG. 6 is a bottom view showing the holder 15 viewed from the "P view" direction indicated in FIG. 5.

The holders 15 and the claws 123, 143 in a first preferred embodiment of the present invention will be described, referring to FIGS. 3 to 6. FIG. 3 is a perspective view showing a tubular member X from which the holder 15 is formed. FIG. 4 is a perspective view showing the holder 15; FIG. 5 is a sectional view along the line A-A in FIG. 2; and FIG. 6 is a bottom view showing the holder 15 viewed from the "P view" direction in FIG. 5.

As shown in FIG. 3, the holder 15 is made of a tubular member X, which will be deformed in a predetermined shape. The tubular member X is made of stainless steel. The tubular member X has openings at both longitudinal ends, and has a rectangular tube shape having a substantially rectangular frame-shape in a cross-section in the longitudinal direction of the tubular member X. The tubular member X has a preformed first convex portion 15a, which will be described hereinafter.

The holder 15 can be prepared by the following manner. First, the magnet 16 is inserted into the tubular member X from its opening x1 (or x2). The magnet 16 is inserted in the direction longitudinal to the tubular member X. The magnet 16 has substantially a rectangular solid shape, and is disposed inside the tubular member X at the middle portion thereof in the longitudinal direction. Each of the openings x1, x2 have their height and width both slightly larger than those of the magnet 16 to be inserted. A tool such as a bar having a scale is used to push and insert the magnet 16 in the tubular member X, while measuring a position of the magnet 16.

Then, the both longitudinal ends are deformed so as to close the openings x1, x2 of the tubular member X. Particularly, as shown in FIG. 3, both ends of the tubular member X are press formed in the direction perpendicular to the direction the magnet 16 is inserted (hereinafter referred to as an "insertion direction"). The press forming process completely closes the openings x1, x2. Accordingly, the magnet 16 is fully covered by the holder 15. Any unneeded portion generated by the press forming process can be cut off.

Undesirable movement of the magnet 16 from the designated position during the press forming process can be prevented by the first convex portion 15a, which holds the magnet 16 at its proper position. This allows the press forming process to be successfully completed with the magnet 16 unmoved. Instead of utilizing the first convex portion 15a, the holder 15 itself can be used to hold the magnet 16, or any magnetic force can be utilized to hold the magnet 16.

As shown in FIG. 5, the holder 15 is disposed between the claws 123, 143. The claw 123 comprises an outer circumference flange 123a extending in the circumference direction from the outer circumference portion of the claw 123, and an inner circumference flange 123b extending in the circumference direction from the inner circumference portion of the claw 123. The claw 143 also comprises an outer circumference flange 143a and an inner circumference flange 143b. The connecting region between the side face of the claw 123 (143) vertical to the circumference direction and the outer circumference flange 123a (143a) forms a curved surface (curved corner 123c (143c)). This curved corner 123c (143c) has the curvature R1 (the inverse number of the curvature radius). Similarly, the connecting region between the side face of the claw 123 (143) vertical to the circumference direction and the inner circumference flange 123b (143b) forms a curved surface (curved corner 123d (143d)). This curved corner 123d (143d) has the curvature R3.

The holder 15 comprises the first convex portion 15a at its bottom face (the face at the inner diameter side). As shown in FIGS. 5 and 6, the first convex portion 15a is formed at the center of the bottom face of the holder 15, projecting toward the inner side (the outer diameter side) of the holder 15, forming a curved shape.

The distance between the apical end of the first convex portion 15a and the upper surface (the face at the outer diameter side) of the holder 15 is made shorter than the height of the magnet 16. Thus, the first convex portion 15a is allowed to elastically contact the magnet. This elastic contact sufficiently determines the position of the magnet 16 at the press forming process, and prevents rattling of the magnet 16. The first convex portion 15a contacts the flat-shaped bottom face of the magnet 16.

The distance between two claws 123, 143 is made substantially the same as the width of the holder 15 in the circumference direction. The distance between the outer circumference flange 123a (143a) and the inner circumference flange 123b (143b) is made slightly smaller than the width of the holder 15 in the radial direction. The holder 15 is press-held between the outer circumference flange 123a (143a) and the inner circumference flange 123b (143b). This construction allows the holder 15 to be sufficiently held between the claws 123, 143, and prevents the rattling otherwise generated between the holder 15 and the claw 123 (143). Further, the press held holder 15 and the first convex portion 15a sufficiently prevents the magnet 16 from rattling.

Each corner (edge) of the holder 15 connecting the upper face and the side face vertical to the circumference direction is chamfered, forming a curved face. The R-chamfered portion 15b has the curvature R2, which is made smaller than the curvature R1 (R2<R1), that is, the chamfered portion 15b has a more gentle curve line than the curvature R1.

Such a construction can lead to the sufficient face contact between the holder 15 and the outer circumference flange 123a (143a), and can decrease the face pressure the holder 15 receives from the outer circumference flange 123a (143a) during the rotation. This decreases the stress per unit area the magnet 16 receives, thereby preventing destruction of the magnet 16.

Similarly, each corner (edge) of the holder 15 connecting the bottom face and the side face relative to the circumference direction is chamfered, thereby forming a curved face. The curvature R4 of the R-chamfered portion 15c is made smaller than the curvature R3 (R4<R3). This construction can sufficiently protect the magnet 16.

According to the preferred embodiment, the magnet 16 is completely enclosed and covered in the holder 15, which can prevent the magnet 16 from getting wet, and prevent deterioration of the output of power generation caused by corrosion of the magnet 16. Further, such construction prevents cracked pieces of the magnet 16 from flying out, and prevents any locking trouble in the rotational mechanism or the like in the vehicle alternator caused by the flied out pieces. Moreover, such construction, as mentioned above, securely positions the holder 15 and the magnet 16, and prevents the rattling of both the holder 15 and the magnet 16.

The first convex portion 15 can be formed at the upper face or side face of the holder 15, rather than the bottom face of the holder 15. In other words, it is the first priority of the first convex portion 15*a* to be formed at the inner face of the holder 15 so as to elastically contact the magnet 16. Such a construction can provide the same advantages as described hereinbefore. The holder 15 can comprise a plurality of first convex portions 15*a*, instead of one. The tubular member X can be made of a tube with a bottom wall having one end opened and the other end closed.

Second Preferred Embodiment of the Present Invention

Figure 7:
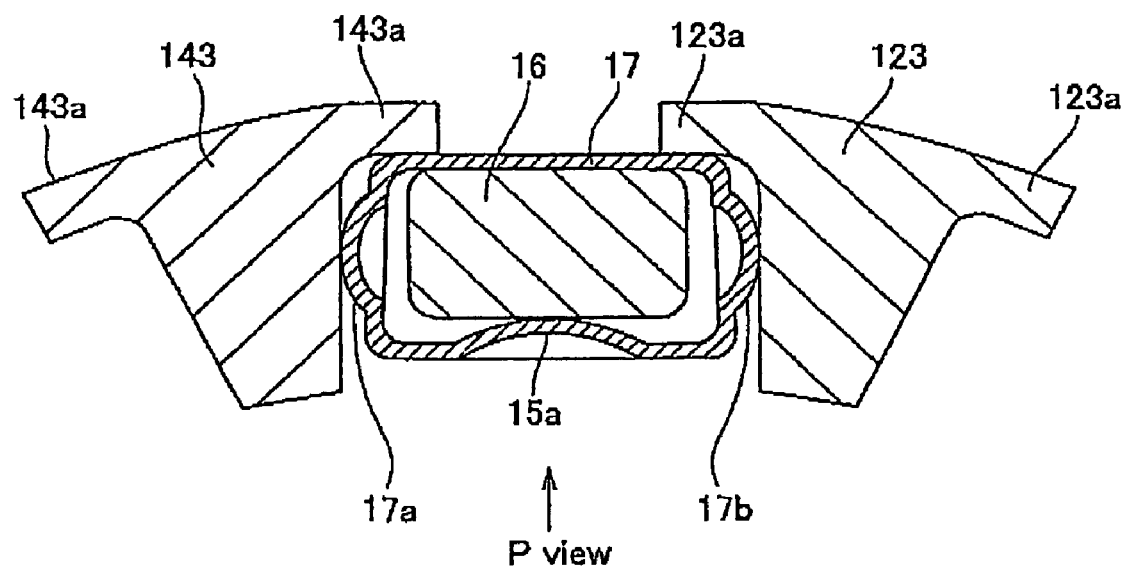
FIG. 7 is a sectional view along line A-A in FIG. 2 showing another embodiment of the holder 17.

A second preferred embodiment of the present invention comprises a holder 17 that is deformed from the holder 15 in the first preferred embodiment, in which the claw 123 (143) does not comprise the inner circumference flanges 123*b* (143*b*). Therefore, the construction having the same structure as the first preferred embodiment will be provided with the same numeral, and will not be described here. The second preferred embodiment will be described referring to FIGS. 7 and 8. FIG. 7 is a sectional view along the line A-A in FIG. 2 showing a second embodiment of the holder 17; and FIG. 8 is a bottom view showing the holder 17 viewed from the "P view" direction in FIG. 7.

Figure 8:
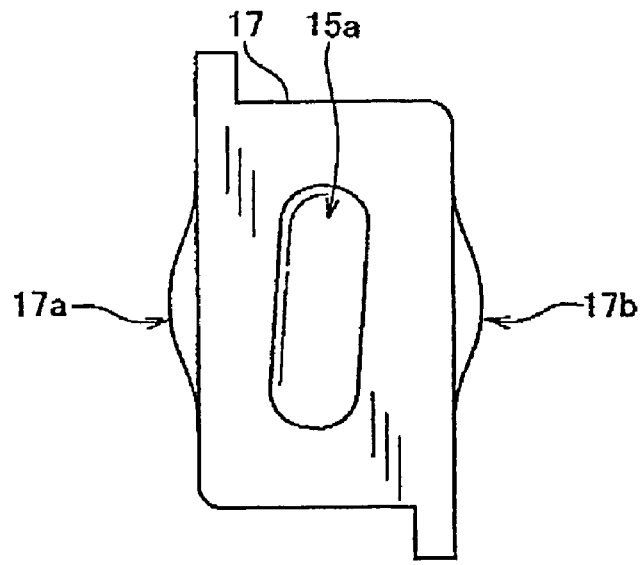
FIG. 8 is a bottom view showing the holder 17 viewed from the "P view" direction indicated in FIG. 7.

As shown in FIGS. 7 and 8, the holder 17 comprises second convex portions 17*a*, 17*b* at the side faces vertical to the circumference direction. The second convex portion 17*a* is formed at the substantially middle portion of the side face of the holder 15, projecting toward the outer side (to the left side in FIG. 7) of the holder 15 in the circumference direction, forming a curved shape. Similarly, the second convex portion 17*b* is formed at the substantially middle portion of the side face of the holder 15, projecting toward the outer side (to the right side in FIG. 7) of the holder 15 in the circumference direction, forming a curvature shape.

The distance between the apical ends of the second convex portions 17*a*, 17*b* is made slightly longer than the distance between the claws 123, 143. Such a construction allows the holder 17 to be press-held between the claws 123, 143. This construction prevents the holder 17 from rattling with respect to the claw 123 (143), and allows the holder 17 to sufficiently hold the magnet 16 like the holder 15 in the first preferred embodiment.

Third Preferred Embodiment of the Invention

Figure 9:
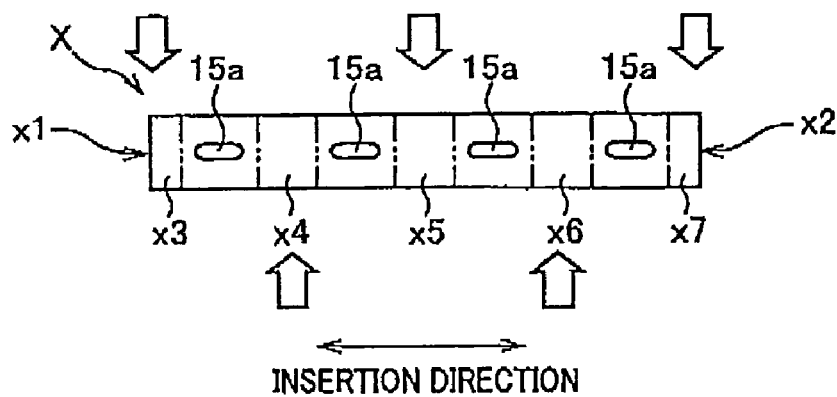
FIG. 9 is a bottom view showing a tubular X member in a second embodiment.
Figure 10:
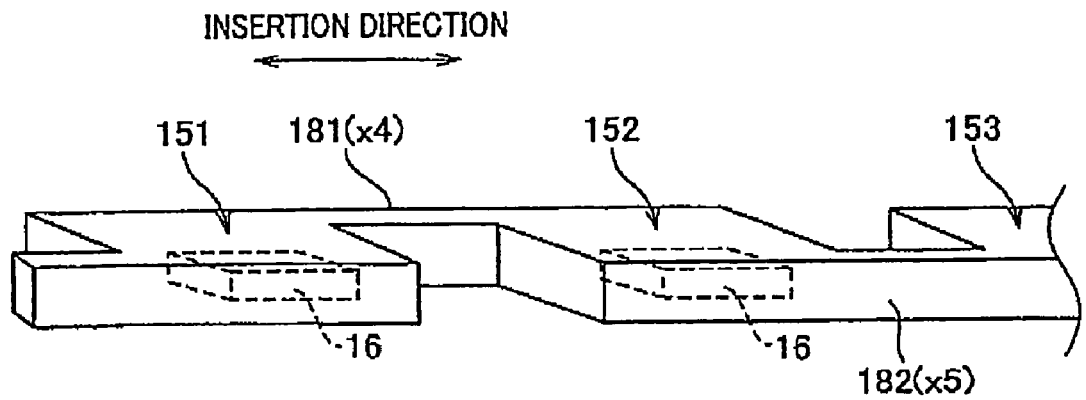
FIG. 10 is a perspective view showing the holders 151, 152, 153 in a third embodiment of the present invention.

A tubular member X used in the third preferred embodiment of the invention is made longer than the tubular member used in the first preferred embodiment in the insertion direction (the direction magnets are inserted). Holders 151, 152, 153, 154 in this embodiment will be described referring to FIGS. 9 to 11. FIG. 9 is a bottom view showing the tubular member X. FIG. 10 is a perspective view showing the holders 151, 152, 153 in this preferred embodiment of the invention.

Figure 11:
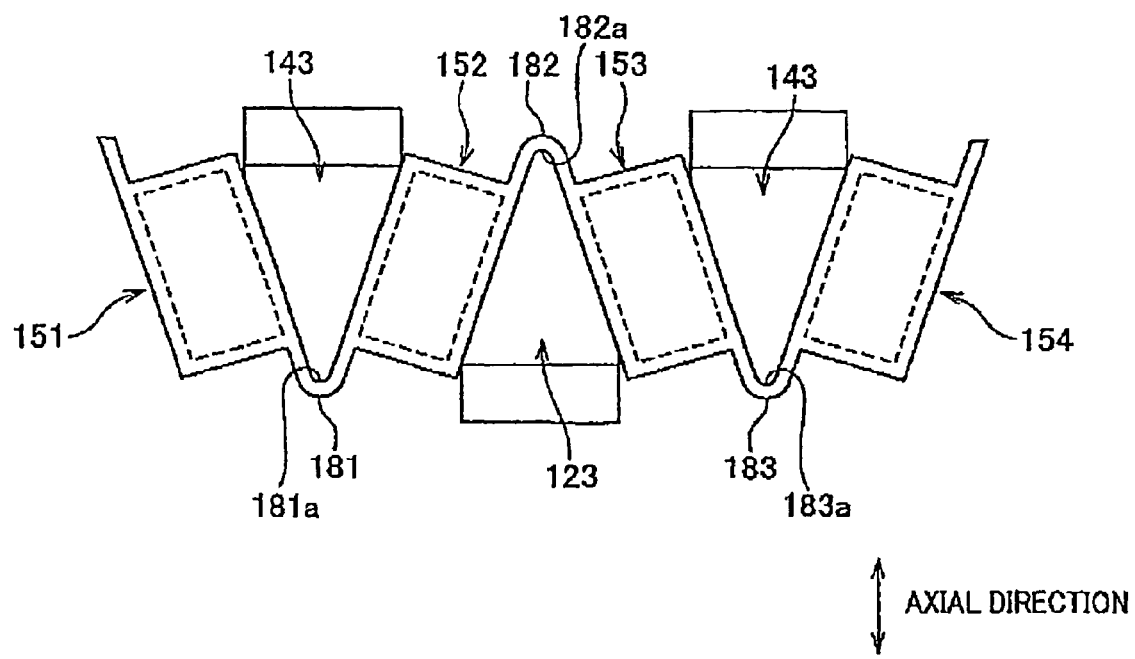
FIG. 11 is a view showing a disposition of holders 151-154, excluding an outer circumference flange 123a (143a)

FIG. 11 is a view showing the disposition of the holders 151, 152, 153, 154, excluding an outer circumference flange 123*a* (143*a*).

As shown in FIG. 9, the tubular member X is provided beforehand with four first convex portions 15*a* that are disposed at regular intervals in the insertion direction (the direction the magnets are inserted). The magnets 16 are inserted from an opening x1 (x2) of the tubular member X. Like the first preferred embodiment, each magnet 16 is inserted while its position is measured with a scale, and is disposed at a corresponding first convex portion 15*a*. The magnet 16 to be inserted in the deep side of the tubular member X is adapted to climb over the first convex portion 15 at the near side and is disposed at the corresponding first convex portion 15 at the deep side. Four magnets 15 are disposed at regular intervals in the tubular member X.

The holders 151, 152, 153, 154 are formed by pressing the both end portions x3, x7 of the tubular member X so as to close the openings x1, x2. The portions x4, x5, x6 of the tubular member X located between the magnets 16, 16 are press formed so that each magnet 16 is inhibited from moving in the insertion direction.

The construction of this embodiment will be described further. The portions x3, x4, x5, x6, x7 of the tubular member X are press formed in the directions shown by the arrows in FIG. 9 (the direction perpendicular to the insertion direction, viewed from the bottom). The both end portions x3, x7 are press formed in the downward direction, closing the openings x1, x2 completely.

The portions x4, x5, x6 locating between magnets 16, 16 are press formed alternately in the opposed directions (the portion x4 is press formed in the upward direction, the portion x5 in the downward direction, and the portion x6 in the upward direction). As shown in FIGS. 9 and 10, the portions facing to each other over the magnet 16 (the portion x4 and the portion x5, and the portion x5 and the portion x6) are press formed in the opposed directions, respectively.

The portions x4, x5, x6 of the tubular member X formed between the magnets 16 are press formed to close the pathway of the magnets 16, like the end portions x3, x7. However, the portions x4, x5, x6 can be formed just to inhibit the magnet 16 from moving in the insertion direction, and they do not have to be formed to completely close the pathway of the magnets 16. That is, at least, the portions x4, x5, x6 should be made to shorten the width of the pathway for the magnet 16 so that the magnet 16 is inhibited from passing through the pathway. The portions x4, x5, x6 between the magnets 16 form connection portions 181, 182, 183, each connecting the holders 151, 152, 153.

As shown in FIG. 11, the connection portions 181, 182, 183 are bent in a convex shape manner. The connection portion 181 is bent so as to form the convex shape in the axially downward direction (forming the projected convex shape), the connection portion 182 is bent so as to form the convex shape in the axially upward direction, and the connection portion 183 is bent so as to form the convex shape in the axially downward direction. The connection portions facing to each other (the portion 181 and the portion 182, and the portion 182 and the portion 183) are bent so as to form the convex shape directing in the opposite directions, forming a bellows shape as a whole as shown in FIG. 11.

The bent connection portions 181, 182, 183 have inner bent faces 181*a*, 182*a*, 183*a*, each abutting on the apical end of the corresponding claw 123 or 143. In this preferred embodiment, the connection portions 181, 182, 183 are bent so as to abut on the apical end of the corresponding claw 123 or 143.

Accordingly, a plurality of holders 151, 152, 153, 154 and the connection portions 181, 182, 183 can be made from a single piece of the tubular member X. This construction allows each of the holders 151, 152, 153, 154 to provide the same structure and advantages as the holder 15 described in the first preferred embodiment. Further, this construction can reduce a number of components used, as well as the production cost. Further, this construction made of a single piece of tubular member X can provide a simple installation operation.

Moreover, the connection portions 181, 182, 183 are disposed on the same circumference as the holder 151, 152, 153, 154, which allows the space originally provided near the apical ends of the claws 123, 143 to be used. This does not require any particular space for the connection portions to be provided at the radial inner side of the claws 123, 143, thereby making the vehicle alternator compact in size and reducing the production cost.

The neighboring connection portions facing to each other (the portion 181 and the portion 182, and the portion 182 and the portion 183) are bent so as to be directed in the opposite directions, forming the convex form. Accordingly, the disposed holders 151, 152, 153, 154 are engaged in such a manner that they do not move in the axial direction, thereby inhibiting the holders from sliding (moving) in the axial direction. The plurality of holders made from a single piece of tubular member X can be particularly three or more (having two or more of connection portions) in order to provide the satisfactory advantages described above.

The neighboring connection portions facing to each other (the portion 181 and the portion 182, and the portion 182 and the portion 183) are press formed in the opposite directions along the direction perpendicular to the insertion direction (the direction the magnets 16 are inserted). Such a construction allows the connection portions 181, 182, 183 to be disposed abutting on the apical ends of the claws 123, 143, providing a stable and accurate positioning.

Figure 12:
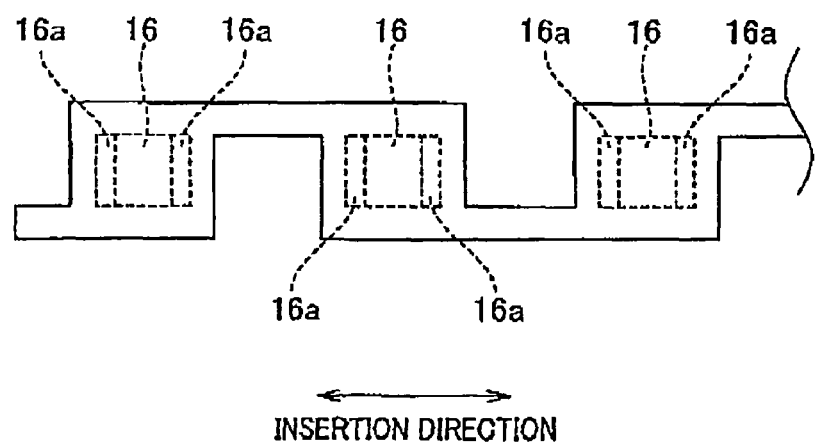
FIG. 12 is a view showing press formed holders and connection portions thereof.

As shown in FIG. 12, elastic members 16a can be provided at both sides of the magnet 16 in the insertion direction. FIG. 12 is a view showing press formed holders and connection portions thereof. This construction can be made, for example, by inserting the magnets 16 in the tubular member X, each of which is preliminary provided with the elastic members 16a. Accordingly, this construction can sufficiently prevent the magnet 16 from breaking caused by the force acting on the magnet 16, during the deformation process of the tubular member X.

While the present invention has been disclosed in terms of the preferred embodiments in order to facilitate better understanding thereof, it should be appreciated that the invention can be embodied in various ways without departing from the principle of the invention.

What is claimed is:

1. A vehicle alternator comprising a rotor, the rotor including:
    a first pole core having a plurality of circumferentially disposed first claws;
    a second pole core having a plurality of circumferentially disposed second claws, each of the second claws and each of the first claws of the first pole core is circumferentially disposed alternately in a face-to-face manner;
    a field coil disposed at the inner diameter side of the circumferentially disposed claws; and
    a plurality of holders, each of the holders contains a magnet and is disposed between the corresponding first claw and the second claw; wherein
    the holder is made of a tubular member, the tubular member has an opening at one or both ends, the tubular member contains the magnet and is deformed by press forming in a direction perpendicular to a direction the magnet is inserted so as to close the opening/openings.

2. The vehicle alternator according to claim 1, wherein:
    the vehicle alternator comprises a plurality of holders, the plurality of holders is made of a single piece of tubular member;
    the tubular member has an opening/openings at its one end/both ends, the tubular member contains a plurality of magnets and is deformed so as to close the opening/openings, the plurality of magnets are disposed at regular intervals;
    particular portions of the tubular member locating between the neighboring two magnets are deformed so as to engage the magnets with the tubular member in such a manner that the magnets are inhibited from moving in the direction the magnets are inserted; and
    each holder is disposed between the corresponding first claw and the second claw.

3. The vehicle alternator according to claim 2, wherein:
    the particular portions of the tubular member locating between two neighboring magnets are designated as connection portions for connecting the holders; and
    each connection portion is bent in a convex shape so as to cause the inner bent face of the convex shape to abut on the apical end of the claw.

4. The vehicle alternator according to claim 3, wherein:
    the tubular member contains three or more magnets;
    the neighboring connection portions facing to each other over the corresponding holder are bent in the opposite directions; and
    each of the connection portions forms a convex shape.

5. The vehicle alternator according to claim 4, wherein the neighboring connection portions facing to each other over the holder are press formed in opposite directions along the direction perpendicular to the direction the magnets are inserted.

6. The vehicle alternator according to claim 1, wherein the holder has a first convex portion, adapted to elastically abut on the magnet.

7. The vehicle alternator according to claim 6, wherein the first convex portion is adapted to abut on a flat portion of the magnet.

8. The vehicle alternator according to claim 1, wherein the holder has second convex portions at its outer faces opposing to the claws, the second convex portions elastically abutting on the claws.

9. The vehicle alternator according to claim 1, wherein:
    the claw has outer circumference flanges extending in the circumference direction from the outer circumference portion of the claw, and
    the holder engages with the outer circumference flanges so as not to move in the radial direction.

10. The vehicle alternator according to claim 9, wherein:
    the claw has inner circumference flanges extending in the circumferential direction from the inner circumference portion of the claw; and
    the holder engages with the outer circumference flanges and the inner circumference flanges so as not to move in the radial direction.

11. The vehicle alternator according to claim 10, wherein the distance between the outer circumference flange and the inner circumference flange is made shorter than the width of the holder in the radial direction.

12. The vehicle alternator according to claim 9, wherein:

an R-chamfered portion is formed between the radial outside face and the circumference side face of the holder;
a curved corner is formed between the circumference side face and the outer circumference flange of the claw; and
the curvature R2 of the R-chamfered portion is made smaller than the curvature R1 of the curved corner.

13. The vehicle alternator according to claim 9, wherein:
an R-chamfered portion is formed between the radial inside face and the circumference side face of the holder;
a curved corner is formed between the circumference side face and the inner circumference flange of the claw; and
the curvature R4 of the R-chamfered portion is made smaller than the curvature R3 of the curved corner.

14. The vehicle alternator according to claim 1, wherein the magnet has an elastic member at its both side faces perpendicular to the direction the magnet is inserted.

15. The vehicle alternator according to claim 1, wherein each end of the tubular member is completely closed by press forming, and the magnet is completely enclosed within the holder.

* * * * *